(12) United States Patent
Simon et al.

(10) Patent No.: US 11,730,085 B2
(45) Date of Patent: Aug. 22, 2023

(54) WOOD CHIPPER WITH DRUM SPEED MONITORING SYSTEM AND CENTRIFUGAL CLUTCH

(71) Applicant: Alamo Group Inc., Seguin, TX (US)

(72) Inventors: Daniel C. Simon, St. Johns, MI (US); Trevor James Atkinson, Alma, MI (US); Michael Thomas Hadanek, Breckinridge, MI (US); Cassandra Jean Ellis, Montrose, MI (US); Elizabeth Ann Schaaf, Mount Pleasant, MI (US)

(73) Assignee: Alamo Group Inc., Seguin, TX (US)

( * ) Notice: Subject to any disclaimer, the term of this patent is extended or adjusted under 35 U.S.C. 154(b) by 238 days.

(21) Appl. No.: 17/017,780

(22) Filed: Sep. 11, 2020

(65) Prior Publication Data

US 2021/0268513 A1    Sep. 2, 2021

Related U.S. Application Data

(60) Provisional application No. 62/983,976, filed on Mar. 2, 2020.

(51) Int. Cl.
*A01G 3/00* (2006.01)
*B02C 25/00* (2006.01)
(Continued)

(52) U.S. Cl.
CPC .............. *A01G 3/002* (2013.01); *B02C 18/24* (2013.01); *B02C 25/00* (2013.01); *B27L 11/00* (2013.01);
(Continued)

(58) Field of Classification Search
CPC ........ B27L 11/005; B27L 11/02; B27L 11/04; B27L 11/06; B27L 11/08; A01G 3/002
See application file for complete search history.

(56) References Cited

U.S. PATENT DOCUMENTS 3,874,602 A * 4/1975 Ciriegio ................ B02C 13/286
                                                         241/101.78
4,961,539 A * 10/1990 Deem ..................... B27L 11/02
                                                         241/101.741
(Continued)

FOREIGN PATENT DOCUMENTS

EP        1808279        7/2007
JP      2018122256       8/2018

OTHER PUBLICATIONS

International Search Report and Written Opinion dated May 21, 2021 in corresponding PCT/US2021/020127 (9 pages).

*Primary Examiner* — Matthew Katcoff
(74) *Attorney, Agent, or Firm* — Pizarro Allen PC

(57) ABSTRACT

A wood chipper having a rotatable drum configured to reduce the size of wood fed into the wood chipper; a sensor configured to sense a speed of rotation of the rotatable drum; and a controller operably connected to the sensor. The controller is configured to cut power to the rotatable drum when the speed of rotation of the rotatable drum drops below a pre-set threshold value. The controller is operably engaged with a centrifugal clutch that is engaged to enable the rotatable drum to be rotated. When the speed of drum rotation drops below the threshold value because debris is slowing down rotation of the drum, the centrifugal clutch is disengaged by dropping engine speed. Disengagement of the centrifugal clutch cuts power to the drum and rotation thereof ceases so that the debris may be cleared.

20 Claims, 11 Drawing Sheets

(51) Int. Cl.
  *B27L 11/00* (2006.01)
  *B27L 11/02* (2006.01)
  *B27L 11/08* (2006.01)
  *B02C 18/24* (2006.01)
  *B02C 18/16* (2006.01)

(52) U.S. Cl.
  CPC ............. *B27L 11/005* (2013.01); *B27L 11/02* (2013.01); *B27L 11/08* (2013.01); *B02C 2018/164* (2013.01)

(56) References Cited

U.S. PATENT DOCUMENTS

| | | | |
|---|---|---|---|
| 5,566,893 A | 10/1996 | Getz | |
| 6,357,684 B1 | 3/2002 | Morey | |
| 6,722,596 B1 | 4/2004 | Morey | |
| 6,814,320 B1 | 11/2004 | Morey et al. | |
| 6,830,204 B1 | 12/2004 | Morey | |
| 7,121,488 B1 | 10/2006 | Marriott et al. | |
| 7,546,964 B2 | 6/2009 | Bouwers | |
| 7,562,837 B2 | 7/2009 | Brand et al. | |
| 7,637,444 B2 | 12/2009 | Stelter et al. | |
| 7,819,348 B2 | 10/2010 | Bouwers et al. | |
| 8,141,802 B2 | 3/2012 | Galloway et al. | |
| 8,317,117 B2 | 11/2012 | Galloway et al. | |
| 8,567,706 B2 | 10/2013 | Bradley et al. | |
| 8,602,333 B2 | 12/2013 | Bradley et al. | |
| 8,628,034 B2 | 1/2014 | Bouwers et al. | |
| 8,684,291 B2 | 4/2014 | Galloway et al. | |
| 9,125,347 B2 | 9/2015 | Morey | |
| 9,233,375 B2 | 1/2016 | Kennedy et al. | |
| 9,321,185 B2 | 4/2016 | Satterwhite | |
| 9,409,310 B2 | 8/2016 | O'Halloran | |
| 9,533,310 B2 | 1/2017 | Dumpor et al. | |
| 9,636,687 B2 | 5/2017 | Kennedy et al. | |
| 9,656,269 B2 | 5/2017 | Kennedy et al. | |
| 9,818,287 B1 * | 11/2017 | Peterson | B27G 21/00 |
| 9,868,121 B2 | 1/2018 | Kennedy et al. | |
| 9,981,405 B2 | 5/2018 | Kennedy | |
| 10,166,696 B2 | 1/2019 | Casper et al. | |
| 10,245,592 B2 | 4/2019 | Kennedy | |
| 11,297,782 B1 * | 4/2022 | Falatok | B27L 11/02 |
| 2006/0144977 A1 | 7/2006 | Berdal et al. | |
| 2007/0069051 A1 | 3/2007 | Hartzler et al. | |
| 2017/0291176 A1 | 10/2017 | Walcutt et al. | |
| 2017/0291177 A1 | 10/2017 | Walcutt et al. | |
| 2019/0046990 A1 | 2/2019 | Walcutt | |
| 2019/0054476 A1 | 2/2019 | Green et al. | |

* cited by examiner

WOOD CHIPPER WITH DRUM SPEED MONITORING SYSTEM AND CENTRIFUGAL CLUTCH

CROSS-REFERENCE TO RELATED APPLICATIONS

This application claims the benefit of U.S. Provisional Patent Application No. 62/983,976, filed Mar. 2, 2020, the entire specification of which is incorporated herein by reference.

TECHNICAL FIELD

This application is directed to equipment used to reduce larger pieces of wood into smaller pieces of wood. More particularly, the disclosure relates to wood chippers, including self-propelled, towable and handfed wood chippers. Specifically, the disclosure is directed to a wood chipper which has a monitoring system for tracking the speed of rotation of the drum used to reduce wood material. The wood chipper also includes a centrifugal clutch that stops drum rotation if the monitored speed drops below a threshold value.

BACKGROUND

Background Information

Wood chippers are machines that are used to cut and chop tree trunks, branches, smaller limbs, and brush into chips. The larger pieces of wood are introduced into the machine through an infeed chute and are subsequently fed automatically by a feed mechanism into a drum housing where they encounter a rotating drum. The drum is provided with cutting blades that slice and chop the larger pieces of wood into smaller pieces. The smaller pieces or chips, are then discharged from the machine through a discharge chute. The chips may be discharged into some type of collection vehicle, such as a trailer, or may simply be discharged onto the ground.

The rotatable drum in the drum housing is driven by a drive assembly which is powered by an engine. The rotating drum will obviously cut smaller, thinner pieces of wood very quickly and easily. When these smaller, thinner pieces of wood are being chipped, the speed of rotation of the drum is not much affected. Larger, thicker pieces of wood, such as tree trunks, on the other hand, are more difficult for the cutting blades on the rotating drum to process. As a result, while cutting thicker pieces of wood, the rotation of the drum may be affected. In particular, larger, thicker pieces of wood may slow the speed of rotation of the drum quite significantly. Since the drum is being driven by the drive assembly which in turn is powered by the engine, having the wood slow the rotation of the drum down significantly can have an adverse effect on the engine and on the drive assembly.

In some instances, the larger, thicker pieces of wood can actually jam the drum and prevent it from rotating. This may be extremely dangerous for the operator of the wood chipper because a person's first instinct tends to be to try and clear the debris that is jamming the drum rotation. If the operator unthinkingly tries to clear the jam and succeeds, he or she may be injured when the drum suddenly starts to rotate again because the drive assembly is still delivering power to the drum.

SUMMARY

The wood chipper disclosed herein has been developed to address the above-mentioned problems.

The presently disclosed wood chipper includes a monitoring system which continuously tracks the speed of rotation of the drum. If the drum speed drops below a pre-set or pre-determined threshold speed because a larger, thicker piece of wood is being processed, the monitoring system will automatically reduce the power that is delivered by the machine's engine. The engine is operatively engaged with a drive assembly which powers the drum by way of a drive shaft. When the engine slows down, the speed of rotation of the drive shaft is reduced. The drive assembly includes a centrifugal clutch which is operatively engaged with the drive shaft. When the drive shaft rotation slows to below a threshold value, the centrifugal clutch will disengage and the drive assembly will stop rotating the cutting drum. It is then safe for an operator to reach in and clear any jammed debris from the drum housing. Once the debris is cleared, the operator will increase the speed of the engine to beyond the necessary threshold speed, so as to reengage the centrifugal clutch. Reengaging the centrifugal clutch will actuate the drive assembly which in turn will cause the drum in the drum housing to rotate once again. The presently disclosed wood chipper will automatically cut power to the cutting drum in the event that the drum becomes locked up by larger, thicker wood pieces or by debris accumulating in the drum housing. The drum will stop rotating and, because the drive assembly is effectively automatically disengaged, it is safe for an operator to manually clear debris from the drum housing. The presently disclosed machine therefore reduces the tendency for the engine and drive assembly to become damaged during processing of larger thicker pieces of wood. The presently disclosed machine also reduces the likelihood that the operator might be injured by reaching into the machine to clear debris blockages that have significantly slowed or jammed the rotating drum.

In one embodiment, the monitoring system includes a sensor provided on the wood chipper which is configured to sense a speed of rotation of the rotatable drum. A controller is operably connected to the sensor and to a drive assembly for driving the rotation of the drum. The controller is configured to cut power to the rotatable drum when the drum's speed of rotation drops below a pre-set threshold value. This may occur, for example, if debris from material being reduced in size by the cutter blades on the drum clogs the machine and slows rotation of the drum. The controller is operably engaged with a centrifugal clutch that forms part of the drive assembly which rotates the drum. When the drum speed rotation drops below the threshold value, the centrifugal clutch is disengaged by reducing the speed of the engine powering the system. Disengagement of the centrifugal clutch cuts power to the drum and rotation of the drum ceases so that the debris may be cleared.

In one aspect, an exemplary embodiment of the present disclosure may provide a wood chipper comprising a drum having a plurality of cutting blades; a drive assembly for rotating the drum, wherein the plurality of cutting blades is adapted to reduce a size of wood materials contacted by the drum as the drum rotates; a monitoring system for monitoring a speed of rotation of the drum; and a release mechanism operatively engaged with the drive assembly and the monitoring system, wherein the release mechanism stops driving rotation of the drum when a monitored speed of rotation of the drum drops below a pre-set threshold.

In one embodiment the monitoring system includes a sensor configured to sense one of the speed of rotation of the drum and a speed of rotation of a drive belt that forms part of the drive assembly that rotates the drum. In one embodiment the monitoring system further includes an indicator that is detected by the sensor, and wherein one of the sensor and indicator is provided on the one of the drum and the drive belt; and the other of the sensor and the indicator is provided on the other of the drum and the drive belt. In one embodiment the sensor is an optical sensor and the indicator is one of a marking, a reflective surface, and a non-reflective surface. In one embodiment the sensor is a magnetic sensor and the indicator is a magnet.

In one embodiment the drive assembly includes an engine that drives a drive shaft which is operatively engaged with the drum; and the monitoring system further includes a processor provided with programming for calculating a ratio of the speed of rotation of the drum relative to a speed of rotation of the drive shaft. In one embodiment the release mechanism is a centrifugal clutch that is movable between an engaged position and a disengaged position; and when the centrifugal clutch is engaged the drum rotates, and when the centrifugal clutch is disengaged, the drum stops rotating. In one embodiment the monitoring system includes a controller operably connected to a sensor, the controller being configured to control an operation of the rotatable drum based on input from the sensor and detection of a drop in a speed of rotation of the rotatable drum. In one embodiment the controller is configured to stop rotation of the rotatable drum if the speed of rotation of the rotatable drum drops below a threshold value. In one embodiment the drive assembly includes an engine operably engaged with the rotatable drum via a centrifugal clutch, wherein said engine is operatively controlled by controller, and when the speed of rotation of the rotatable drum drops below the threshold value, the controller disengages the centrifugal clutch by reducing power generated by the engine.

In another aspect, an exemplary embodiment of the present disclosure may provide a wood chipper comprising an infeed system; a rotatable cutting system spaced from the infeed system; a drive system for driving the rotatable cutting system; a detector disposed in communication with the rotatable cutting system and the drive system, the detector arranged to detect a speed of rotation of the rotatable cutting system; and wherein the detector allows rotation of the rotatable cutting system when a pre-set threshold speed of rotation is met or exceeded by the rotatable cutting system; and wherein the detector causes the drive system to cut power to the rotatable cutting system when the speed of rotation of the rotatable cutting system drops below the pre-set threshold speed of rotation. In one embodiment, the drive system includes a centrifugal clutch that is engaged when the pre-set threshold speed is met or exceeded and is disengaged when the rotation speed drops below the pre-set threshold.

In another aspect, an exemplary embodiment of the present disclosure may provide a method of controlling a material reduction device comprising feeding material to be reduced in size toward a reducing mechanism; rotating the reducing mechanism; reducing the material with the rotating reducing mechanism; detecting a speed of rotation of the rotating reducing mechanism; controlling a drive assembly that drives the rotation of the rotating reducing mechanism based on the detected speed of rotation; and causing the reducing mechanism to cease rotating when the speed of rotation drops below a threshold value while the rotating reducing mechanism is reducing material.

In one embodiment of the method, the detecting of the speed of rotation includes providing a sensor configured to sense the speed of rotation of the reducing mechanism; gathering speed of rotation data with the sensor; comparing the gathered data with a speed of an engine powering the drive assembly; calculating a ratio of the speed of rotation of the reducing mechanism with the speed of the engine; and reducing the speed of the engine if the ratio is lower than the threshold value. In one embodiment, the method further comprises disengaging a centrifugal clutch when the speed of the engine is reduced. In one embodiment, the disengaging of the centrifugal clutch causes the reducing mechanism to cease rotating.

In one embodiment the method further comprises slowing the speed of rotation of the reducing mechanism by accumulating material debris around the reducing mechanism. In one embodiment the method further comprises removing the accumulated material debris when rotation of the reducing mechanism has ceased. In one embodiment the method further reengaging the drive assembly when the accumulated material debris has been removed. In one embodiment the method further comprises engaging the centrifugal clutch of the drive assembly when the drive assembly speed reaches a pre-set threshold value; and restarting rotation of the reducing mechanism when the centrifugal clutch is reengaged.

In another aspect, an exemplary embodiment of the present disclosure may provide a wood chipper comprising a rotatable drum configured to reduce a size of wood fed into the wood chipper; a sensor configured to sense a speed of rotation of the rotatable drum; and a controller operably connected to the sensor, the controller being configured to cut power to the rotatable drum when the speed of rotation of the rotatable drum drops below a pre-set threshold value.

BRIEF DESCRIPTION OF THE SEVERAL VIEWS OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION

Figure 1:
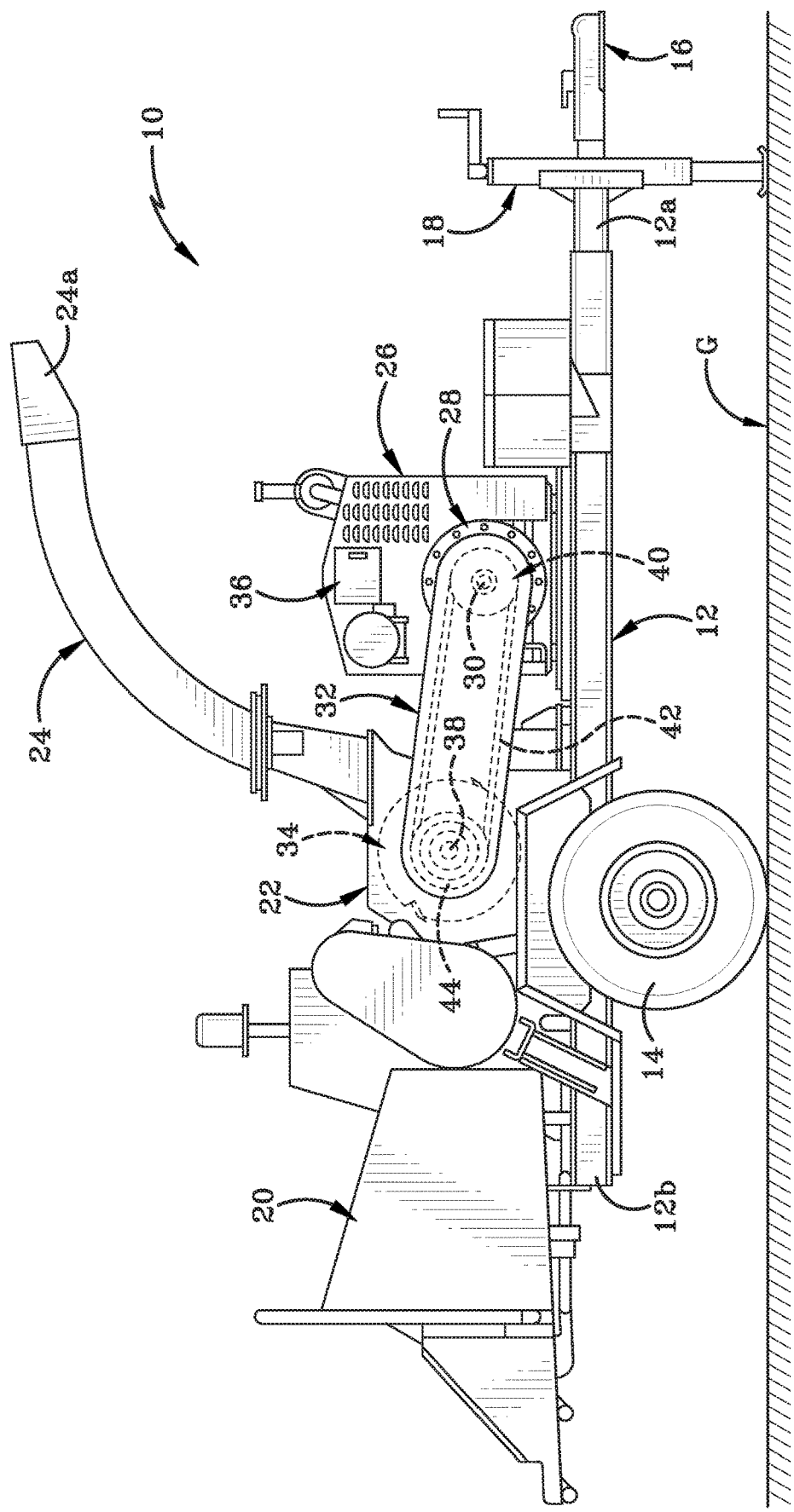
FIG. 1 is a right side elevation view of an exemplary wood chipper in accordance with an aspect of the present disclosure.

Referring to FIGS. 1-6, there is shown an apparatus for reducing the size of pieces of wood such as tree trunks and tree limbs to wood chips. The apparatus or wood chipper is indicated herein by the reference number 10. Wood chipper 10 as illustrated herein is exemplary of an apparatus for chipping wood. Wood chipper 10 as illustrated as being configured to be able to be towed behind a vehicle. Furthermore, as illustrated, wood chipper 10 is of a size and configuration suitable for having wood materials fed into the same by hand or by a small piece of auxiliary equipment.

Wood chipper 10 includes a frame 12 upon which are mounted at least one pair of wheels 14 for moving the frame 12 across the ground "G". A hitch assembly 16 and a landing gear 18 are also provided on frame 12. Hitch assembly 16 is provided on a front end 12a of frame 12 and enables frame 12 to be operatively engaged with a towing vehicle (not shown). Landing gear 18 is engaged with frame 12 rearwardly of hitch assembly 16 and is movable between a use position (shown in FIG. 1) and a storage position (not shown). In the use position, landing gear 18 is moved to a vertical orientation to support front end 12a of frame 12 a distance above the ground "G". Landing gear 18 is moved to a storage position when hitch assembly 16 is engaged with the towing vehicle. When in the storage position, landing gear 18 is generally horizontally oriented adjacent the front end 12a of frame 12.

A variety of different components are secured to frame 12. It should be understood that not all of the components that are provided on wood chipper 10 are illustrated and/or described herein. Only those components relevant for the understanding of the present disclosure are illustrated and described in detail.

It should be understood that the wood chipper may take any one of a variety of other different configurations from what is illustrated in FIGS. 1-6 and that the various components forming part of the wood chipper may be arranged differently from what is shown in the attached figures.

Wood chipper 10 includes an infeed chute 20 located proximate a rear end 12b of frame 12 and a drum housing 22 located forwardly of infeed chute 20. Although not illustrated herein, it will be understood that an automatic feed mechanism may connect the infeed chute 20 and drum housing 22 so that wood materials introduced into the wood chipper 10 through infeed chute are moved forward toward drum housing 22 for processing. A discharge chute 24 extends upwardly and outwardly from drum housing 22. Chips from wood materials processed in drum housing 22 are discharged from wood chipper 10 through discharge chute 24. Discharge chute 24 may be mounted for rotation relative to drum housing 22. Discharge chute 24 may be rotated about a vertical axis to any suitable orientation so as to direct an outlet 24a on chute 24 in any desired direction.

Wood chipper 10 also includes an engine housing 26 mounted on frame 12 forwardly of drum housing 22. An engine 28 is mounted within engine housing 26 along with various other components such as a cooling fan (not shown). A drive shaft 30 extends outwardly from engine 28 and is operatively engaged with a drive assembly 32 which is used to drive and rotate a cutter drum 34 mounted within drum housing 22.

A controller 36 is operatively engaged with engine 28 and with the various other pieces of electronic equipment on wood chipper 10. Controller 36 is illustrated as being mounted on engine housing 36 but it will be understood the controller 36 may be provided at any suitable location on wood chipper 10. Controller 36 includes a processor provided with programming to operate the various functions of wood chipper 10, as will be described later herein.

Some of the aforementioned components will be described in greater detail hereafter.

Figure 2:
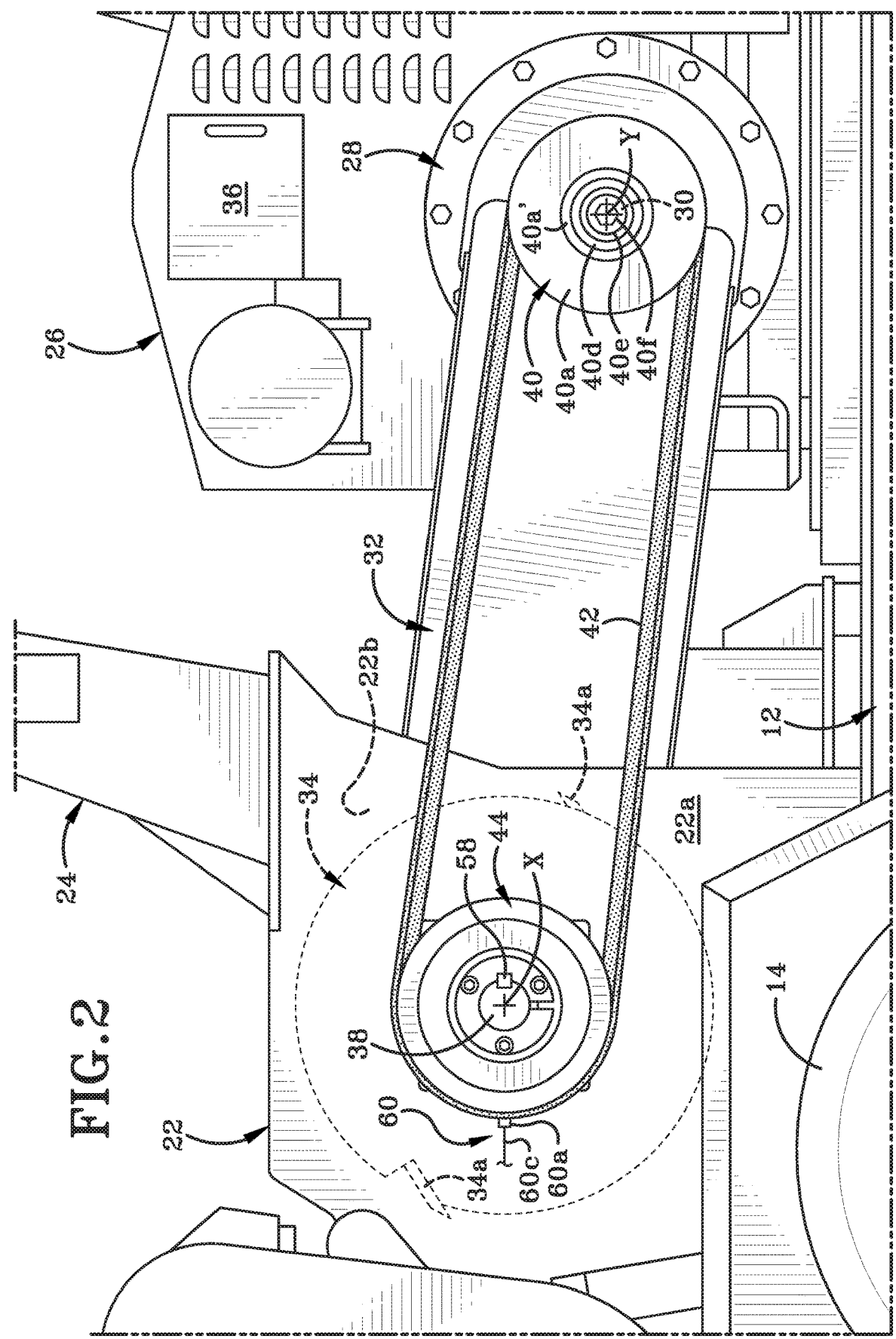
FIG. 2 is an enlarged right side elevation view of the drive assembly of the wood chipper with the protective cover removed therefrom.

As shown in FIG. 2, drum housing 22 has an exterior wall 22a that bounds and defines an interior chamber 22b in which drum 34 is mounted onto a drum drive shaft 38. Drum drive shaft 38, as illustrated, is oriented substantially horizontally and is rotated about a horizontal axis "X" as will be described later herein. An exterior circumferential surface of drum 34 is provided with a plurality of cutting knives 34a or cutting blades 34a. When tree trunks, branches, limbs, and/or brush is fed into wood chipper 10 through the infeed chute 20 (FIG. 1), the automatic feed system (not shown) conveys the tree trunks, branches etc. into the interior chamber 22b of drum housing where they are contacted by the rotating drum 34. The cutting knives or blades 34a provided on drum 34 cut up and slice the wood materials as the drum 34 rotates, thereby reducing the larger wood materials in overall size to chips. The chips are mechanically moved forwardly and upwardly toward discharge chute 24 by drum 34 and may furthermore be entrained by air flowing through interior chamber 22b and be moved toward discharge chute 24. As indicated earlier herein, discharge chute 24 may be rotated to discharge the chips into a trailer or other chamber, or may simply deposit the chips on the ground "G".

Drive assembly 32 includes a centrifugal clutch 40, a drive belt 42, and a drive wheel 44. Centrifugal clutch 40 is operatively engaged with engine 28 via drive shaft 30. Drive wheel 44 is operatively engaged with drum 34 via drum drive shaft 38. Drive belt 42 is a continuous drive belt that passes around centrifugal clutch 40 and around drive wheel 44. When engine 28 is actuated via controller 36, drive shaft 30 is caused to rotate about an axis "Y". Rotation of drive shaft 30 ultimately causes centrifugal clutch 40 to engage and rotate in unison with drive shaft 30, as will be described later herein. The engaged and rotating centrifugal clutch 40 drives drive belt 42 which, in turn, causes drive wheel 44 to rotate about axis "X". (In the particular configuration of drive assembly 32 illustrated herein, axis "X" and axis "Y" are parallel and spaced apart. Rotation of drive wheel 44 causes rotation of drum drive shaft 38. Rotation of drum drive shaft 38 causes drum 34 to rotate and reduce materials fed into drum housing 22 with cutting blades 34a. A typical speed of rotation of drum 34 during reduction of materials is in the range of 800 rpm up to about 3800 rpm and preferably around 2400 rpm.

Centrifugal clutch 40 may be any suitable type of centrifugal clutch. As illustrated herein, an exemplary centrifugal clutch includes a clutch housing 40a that bounds and defines a chamber 40b and circumscribes a central hub 40c. Hub 40c is operatively engaged with drive shaft 30 that extends outwardly from engine 28. Hub 40c is secured to drive shaft by way of a key 46 which ensures that drive shaft 30 and hub 40c will rotate in unison. Clutch 40 further includes a pair of clutch shoes 48 that are located within chamber 40b and are configured on opposing sides of hub 40c. Referring to FIG. 6 a bearing 40d is mounted within a bearing portion 40a' of clutch housing 40a and is secured to drive shaft 30 via a washer 40e and bolt 40f. Bearing 40d enables drive shaft 30 to rotate freely within housing 40a prior to engagement of clutch shoes 48 without rotating housing 40a, as will be described later herein. Each clutch shoe 48 includes a fly weight 48a and a friction pad 48b. A pair of tension springs 50 secures the two fly weights 48a to each other. In inner surface 40a' of clutch housing 40a is located radially outwardly from friction pads 48b such that when the clutch is at rest or disengaged, a gap 52 (FIGS. 5A, 5B) is defined between inner surface 40a' and friction pads 48b. Clutch housing 40a covers and protects hub 40c, clutch shoes 48, and springs 50.

Figure 5A:
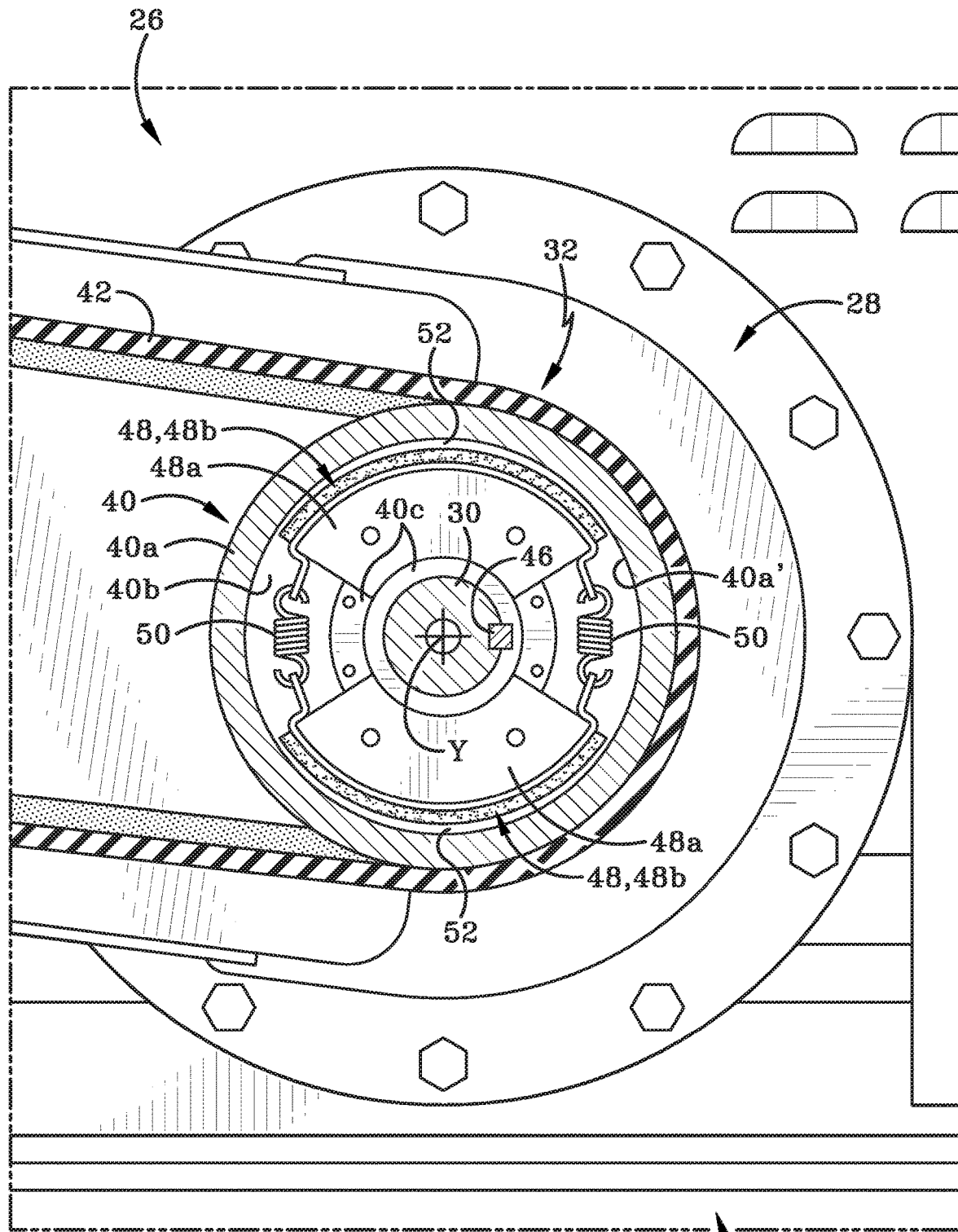
FIG. 5A is an enlarged partially-sectioned right side elevation view of a centrifugal clutch and a portion of the wood chipper engine, and showing the centrifugal clutch disengaged and the drive assembly stationary.
Figure 6:
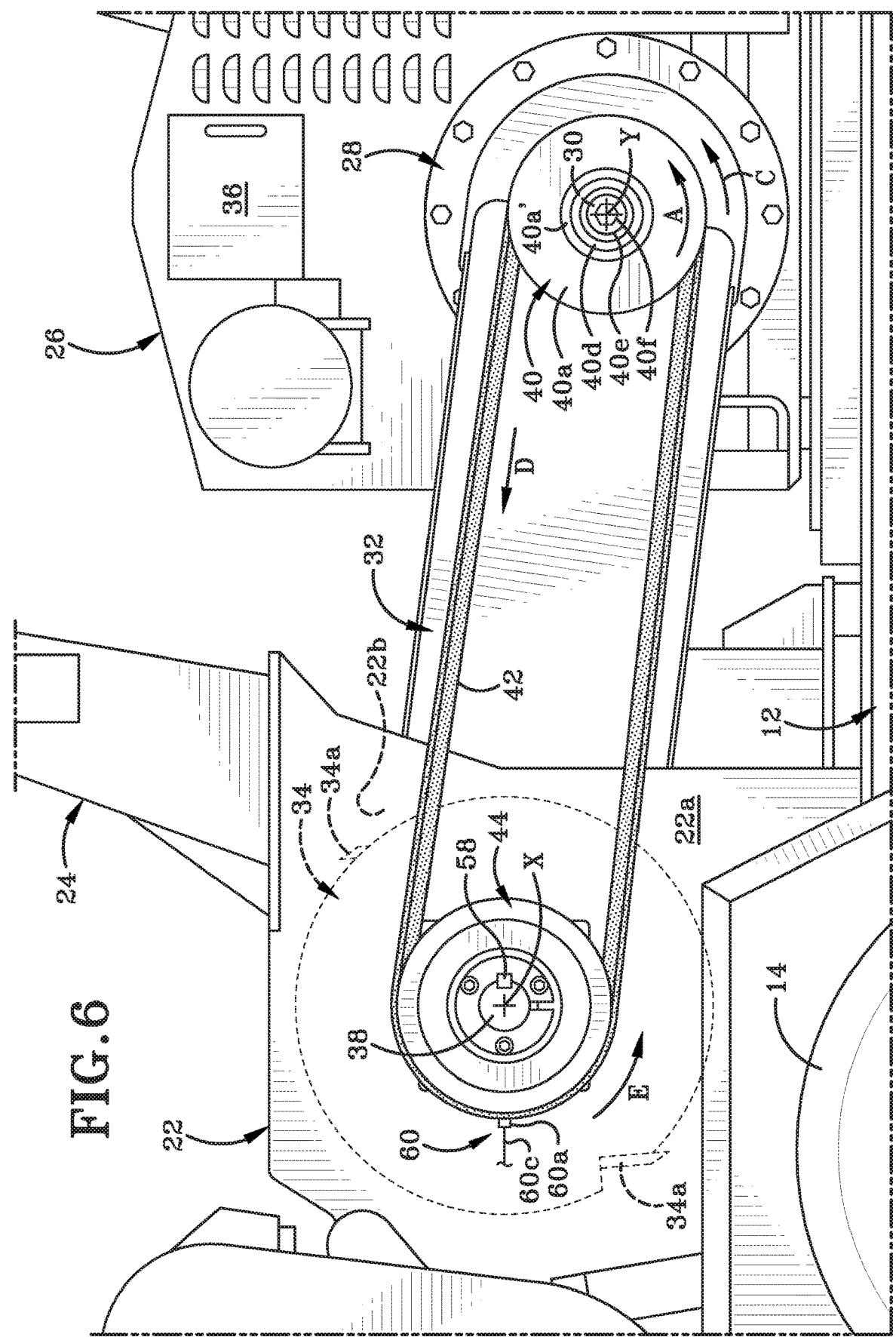
FIG. 6 is a partial right slide elevation view of the wood chipper showing the clutch housing rotating and driving rotation of the drive belt which in turn rotates the drive wheel engaged with the cutting drum, thereby causing rotation of the cutting drum.

FIG. 5A shows centrifugal clutch 40 in a rest position or disengaged position. This rest position or disengaged position may occur when engine 28 is not rotating drive shaft 30, is idling, or simply is not rotating beyond a pre-set threshold rotational speed that will actuate centrifugal clutch 40. An exemplary threshold value at which centrifugal clutch 40 will engage is between 1100 rpm and 1700 rpm, and preferably is at 1500 rpm. In this disengaged position shown in FIG. 5A, the tension springs 50 are contracted and keep clutch shoes 48 in contact with hub 40c and as close as possible to each other. As indicated above gap 52 is defined between the friction pad 48b of each clutch shoe 48 and an inner surface 40a' of clutch housing 40a.

Figure 5B:
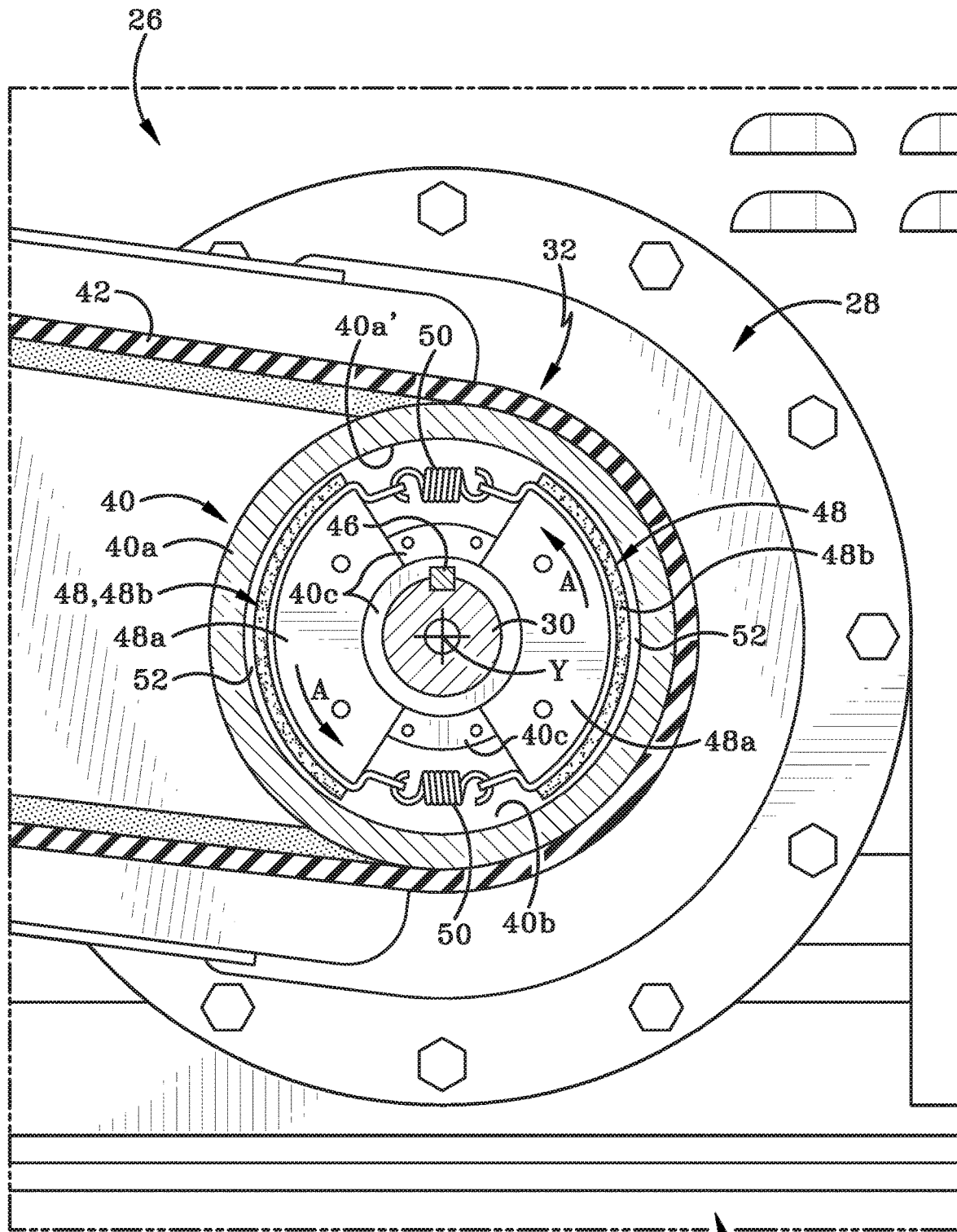
FIG. 5B is an enlarged partially-sectioned right side elevation view of the centrifugal clutch and the portion of the wood chipper engine, and showing the drive shaft from the engine rotating the centrifugal clutch at a speed insufficient to engage the centrifugal clutch with the rest of the drive assembly.

When engine 28 is actuated to increase the speed of rotation of drive shaft 30, drive shaft 30 will impart rotational motion to hub 40c which, in turn, will cause clutch shoes 48 to begin to be rotated as indicated by arrow "A" in FIG. 5B. FIG. 5B shows a situation where the rotation of drive shaft 30 is below a pre-determined or pre-set threshold rate of rotation, in particular, a relatively low rpm (revolutions per minute), for example 1200 rpm. So, even though hub 40c and clutch shoes 48 are rotating in the direction "A", the gap 52 is still defined between friction pads 48b and inner surface 40a' of clutch housing 40a. It should be noted that at this low rpm, clutch housing 40a is not engaged by friction pads 48b and remains stationary. Because clutch housing 40a is stationary, drive belt 42 is stationary.

Figure 5C:
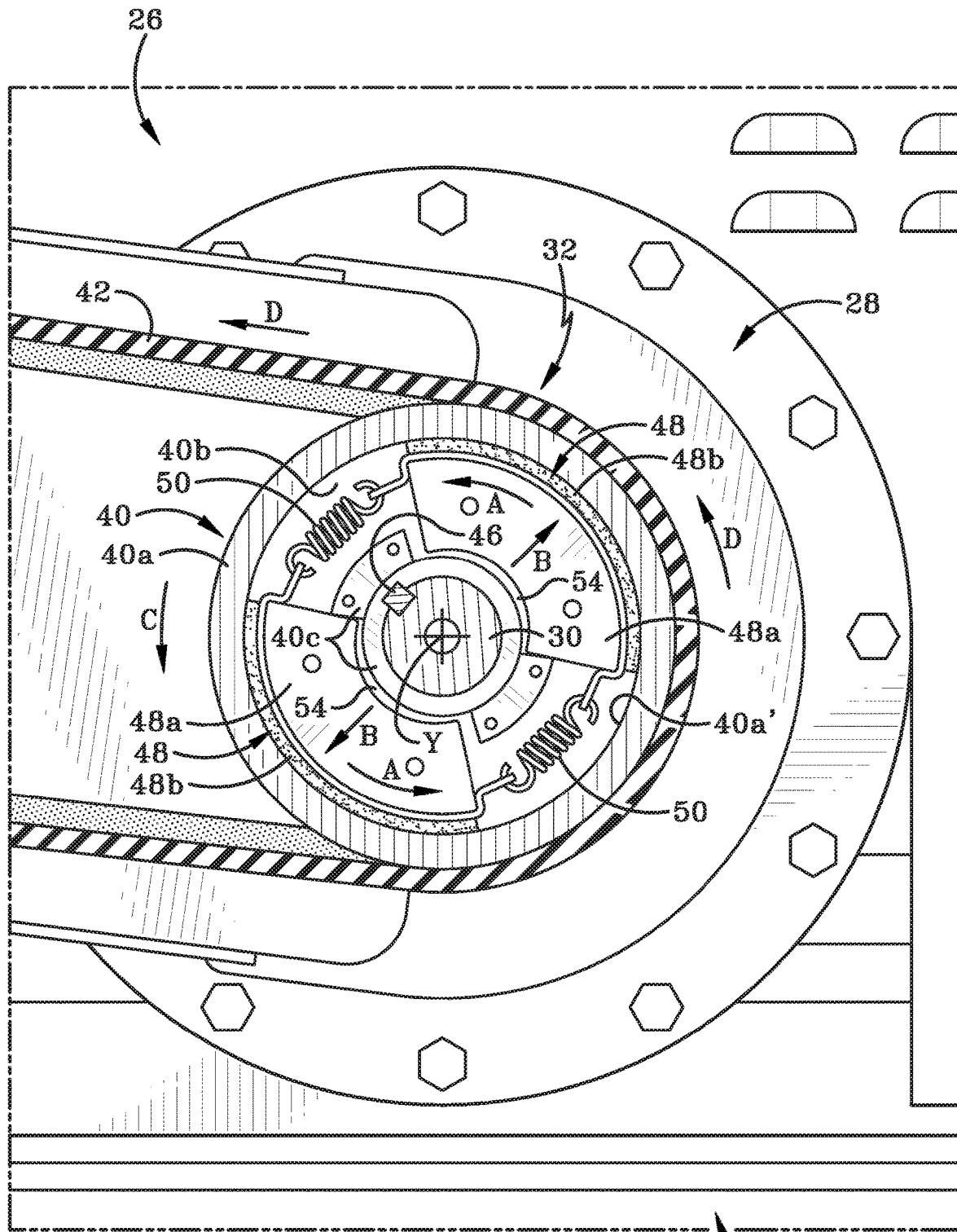
FIG. 5C is an enlarged partially-sectioned right side elevation view of the centrifugal clutch and the portion of the wood chipper engine, and showing the drive shaft from the engine rotating the centrifugal clutch at a speed sufficient to engage the centrifugal clutch with the rest of the drive assembly and showing the clutch housing rotating and initiating rotation of the drive belt of the drive assembly.

FIG. 5C shows a scenario where the engine 28 has been actuated to rotate drive shaft 30 beyond the pre-determined or pre-set threshold speed of rotation. In other words, drive shaft 30 is rotating at a relatively high rpm. The rapidly rotating drive shaft 30 imparts its motion to hub 40c and clutch shoes 48 move in the direction "A". However, because of the high rate or rotation, centrifugal force on clutch shoes 48 throws the weighted fly weights 48a outwardly in the direction indicated by arrow "B". This motion in the direction "B" brings friction pads 48b of clutch shoes 48 into contact with inner surface 40a' of clutch housing 40a. It should be noted that the gap 52 (FIG. 5A) closes and a gap 54 (FIG. 5C) opens up. The rotational motion of clutch shoes 48 is thereby imparted to clutch housing 40a which also begins to rotate in the direction indicated by arrow "C" (FIG. 5C). Rotation of clutch housing 40a, in turn, causes rotation of drive belt 42 as indicated by arrow "D".

Drive belt 42 passes around an exterior surface of clutch housing 40a. In some instances, drive belt 42 is a rubber belt, particularly a V-shaped rubber drive belt. The clutch housing 40a may be specially grooved or otherwise configured to keep drive belt 42 engaged therewith. In other embodiments, the drive belt may be a chain instead of a rubber belt and the exterior surface of the clutch housing may be provided with teeth or sprockets to engage the chain.

Figure 3:
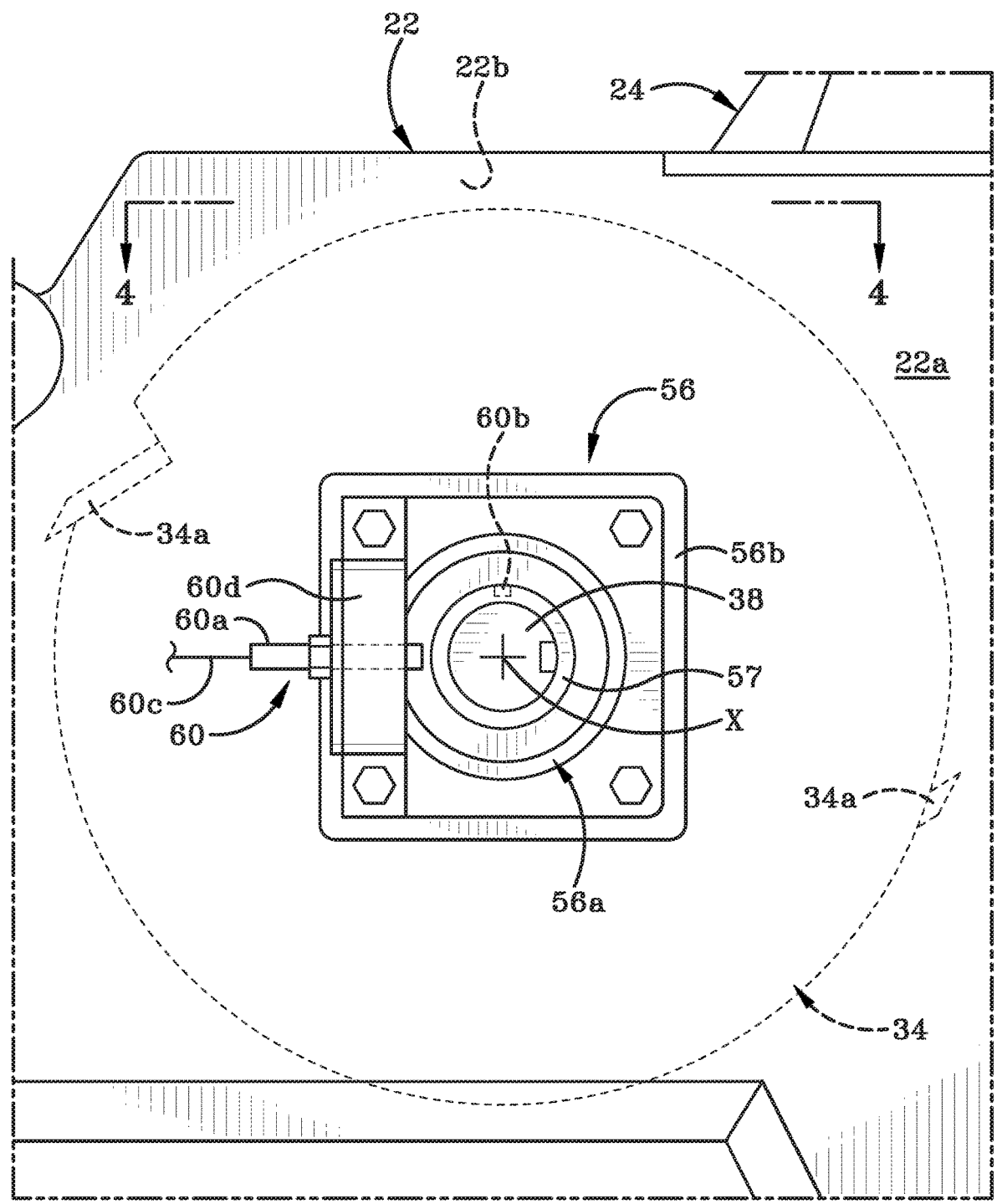
FIG. 3 is an enlarged right side elevation view of the drive wheel of the drive assembly and the sensor of the monitoring system shown in relation to the drum housing and cutting drum, and with the drive belt removed for clarity of illustration.
Figure 4:
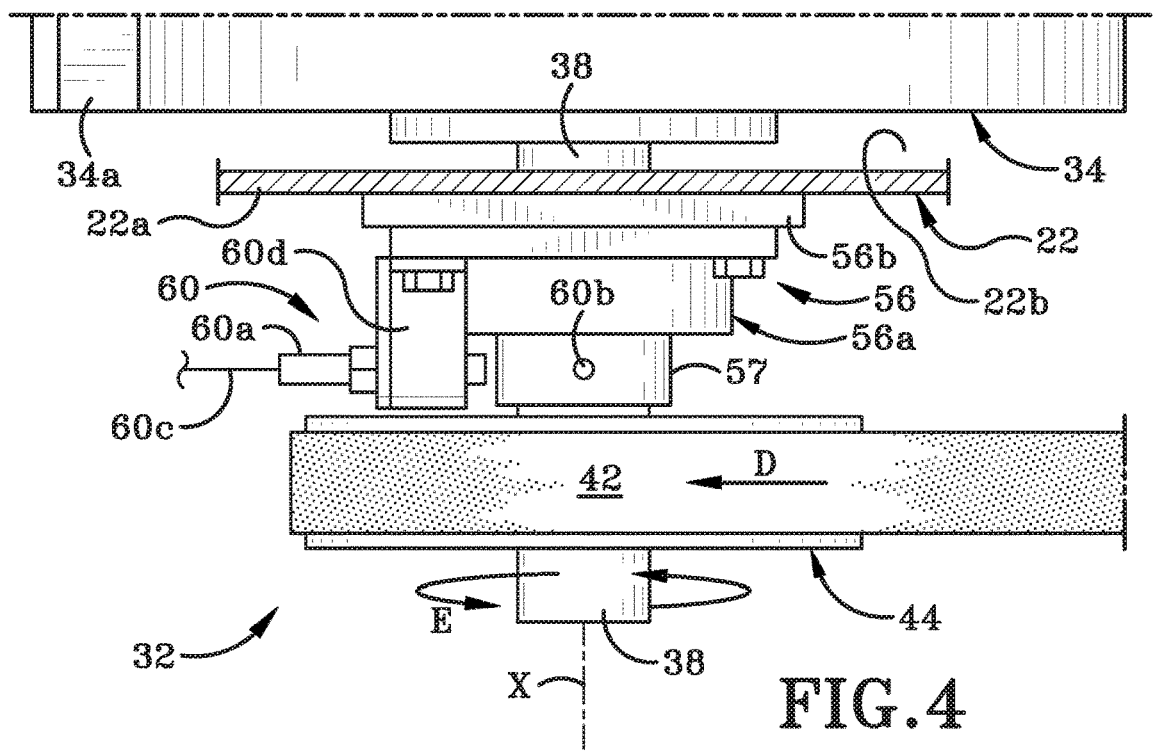
FIG. 4 is a partially-sectioned top plan view of the drive wheel and sensor taken along line 4-4—of FIG. 3, with the drive wheel and sensor shown adjacent the side wall of the drum housing and including a length of the drive belt engaged with the drive wheel.
Figure 4A:
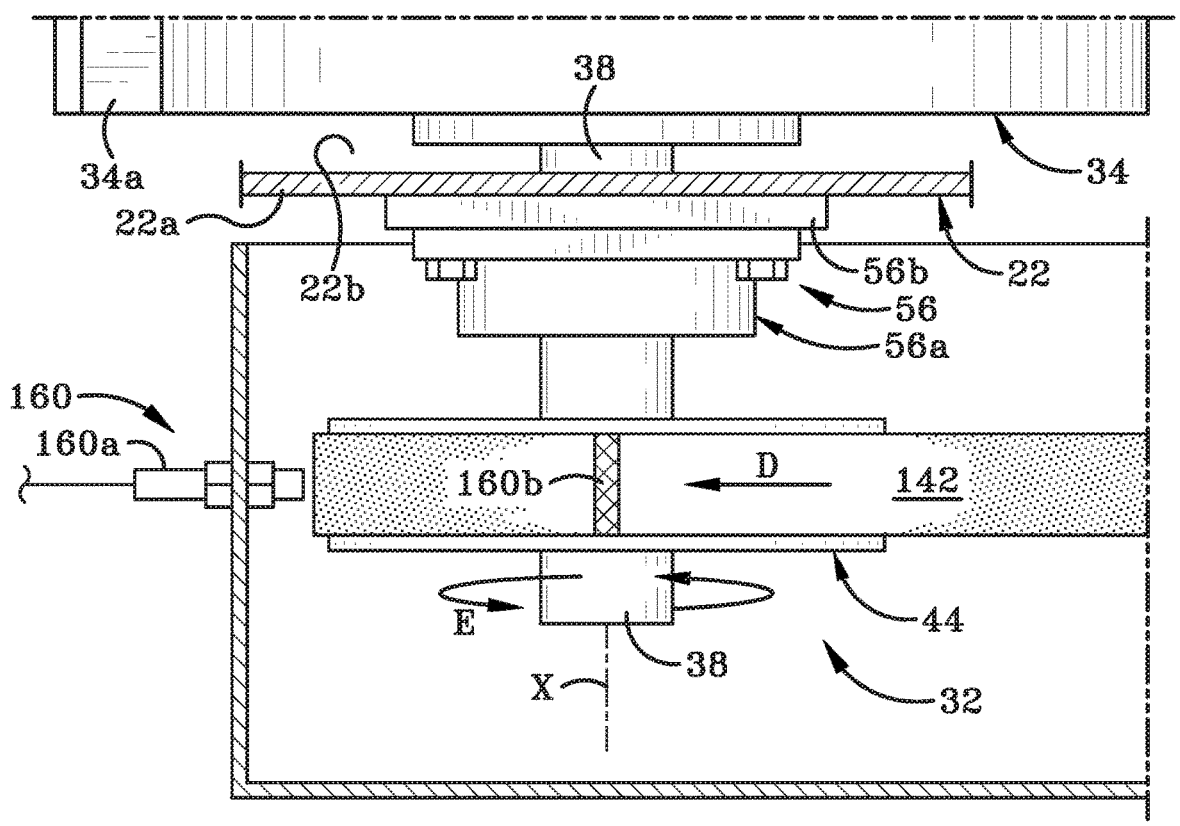
FIG. 4A is a partially-sectioned top plan view of the drive wheel together with a second embodiment of a sensor and a second embodiment of a drive belt engaged with the drive wheel.

Referring now to FIGS. 2-4A, drive wheel 44 is engaged with drum housing 22 via a mounting assembly 56 that includes a bearing assembly 56a and a mounting plate 56b. Bearing assembly 56a enables drum drive shaft 38 and thereby drive wheel 44 to rotate relative to side wall 22 of drum housing 22. FIG. 4A shows a sleeve 57 which circumscribes shaft 38 and rotates in unison with shaft 38. Drum drive shaft 38 extends outwardly from drum 34, passes through aligned apertures (not shown) defined in the wall 22a of drum housing 22 and a mounting plate 56b of mounting bracket. Drum drive shaft 38 extends through a portion of bearing 56a and is secured thereto by a key 58 (FIG. 2). This arrangement ensures that drum drive shaft 38 will rotate in unison with drive wheel 44 when drive wheel 44 is caused to rotate by drive belt 42. The rotation of drum drive shaft 38 is indicated by the arrow "E" in FIGS. 4 and 4A. When drum drive shaft 38 rotates, drum 34 is caused to rotate in unison therewith.

Wood chipper 10 includes a monitoring system 60 (FIGS. 2-4A) that is utilized to monitor the rotational speed of drum 34. Monitoring system 60 includes a sensor 60a that is configured to sense an indicator 60b. As illustrated in FIG. 4A, sensor 60a is mounted on or is integral with, mounting assembly 56. A mounting bracket 60d is illustrated as securing sensor 60a to mounting plate 56b. Indicator 60b is shown as being provided on bearing assembly 56, particularly on sleeve 57. Indicator 60b is provided in a location that is periodically alignable with appropriate components on sensor 60a to ensure that sensor 60a is able to read (or sense) indicator 60b. Sensor 60a is illustrated as being connected by wiring 60c to controller 36 (FIG. 1) mounted on engine housing 26. In other embodiments, sensor 60a may be wirelessly connected to controller 36. Monitoring system 60 in conjunction with programming in controller 36 monitors and regulates the drive assembly 32 as will discussed hereafter.

FIG. 3 shows sensor 60a mounted on drum housing 22 by way of mounting assembly 56 and indicator 60b provided on sleeve 57. In another embodiment (not shown herein), sensor 60a may, instead, be provided on mounting assembly 56 and indicator 60b may be provided on drum drive shaft 38 itself. In another embodiment, sensor 60a may be provided on drum drive shaft 38 or bearing 56a or sleeve 57 and indicator 60b may be provided on mounting assembly 56 or on drum housing 22. Regardless of where the sensor 60a and indicator 60b are provided, each rotation of drum drive shaft 38 through 360° brings indicator 60b into alignment with sensor 60a or vice versa. When sensor 60a and indicator 60b are in alignment, sensor 60a will sense or read indicator 60b and signal speed data or any other type of attribute being tracked to monitor drum rotation to controller 36. The programming in controller 36 will use the signaled data to calculate a ratio of drum speed to engine speed and will then compare the calculated ratio with a pre-set or predetermined ratio stored in the programming. If the ratio is above the stored threshold, the engine 28 will continue to deliver power to the drive assembly 32 at the same rpm. If, however, the calculated ratio is below the stored threshold value, then the programming in controller 36 will determine that the drum 34 is rotating too slowly and will lower the engine rpm. For example if the drum speed is between 2400 rpm and 2450 rpm and the engine speed is between 1900 rpm and 2800 rpm, the ratio of drum-to-engine rpm will be about 1:1. If the ratio is at or above the threshold ratio, in this example case being 1:1, the engine 28 will continue to deliver power to the drum 34. If the ratio is below the threshold ratio by a desired percentage, in this case 10%, the engine rpm will be automatically lowered to about 1100 rpm. This rpm will be below the threshold value of from about 700 rpm up to about 1300 rpm, and preferably around 1200 rpm. As a result, the centrifugal clutch 40 will disengage. In other words, the speed of drive shaft 30 will drop to the point that the centrifugal force no longer can hold clutch shoes 48 in contact with clutch housing 40a and the clutch shoes 48 will be pulled inwardly toward hub 40c by springs 50. Clutch housing 40a will stop rotating in the direction of arrow "C" and therefore drive belt 42 will stop rotating. When drive belt 42 stops moving, drive wheel 44 and thereby drum drive shaft 38 will stop rotating. When drum drive shaft 38 stops rotating, drum 34 will stop rotating and drum 34 will therefore no longer reduce material with its cutter blades 34a.

It will be understood that that the centrifugal clutch activation speed may be adjusted and that there may be some variability in the clutches due to manufacturing variation in the springs. Designed changes may be on the scale of 100's-1000's of RPMs, while manufacturing deviation may be in the range of dozens of RPMs (and increases/scales as the activation RPM increases).

It will be understood that sensor 60a and the cooperating indicator 60b are configured for use with each other. Sensor 60a may take any suitable form. For example, sensor 60a may be an optical sensor that detects the presence of an indicator 60b that is in the form of a marking or a type of surface. For example, if the indicator 60b is a physical mark provided on an exterior surface of drum drive shaft 38, each time that physical mark is brought into alignment with the optical sensor 60a, the optical sensor detects the presence of that mark. In other instances, the indicator 60b may be a beam of light. In other instances, the indicator 60b may be a reflective surface that reflects a light beam emitted by the optical sensor 60a. In other instances, the indicator 60b may be a non-reflective surface that momentarily stops the reflection of a light beam emitted by the optical sensor 60a. In other words, sensor 60a may be any suitable optical sensor including but not limited to a reflective sensor, an interruptive sensor, and an optical encoder. The indicator 60b may be any suitable component that cooperates with optical sensor 60a to provide the desired rotational speed of drum 34.

Sensor 60a may, alternatively be any suitable magnetic sensor, such as a Hall-effect sensor. If sensor 60a is a magnetic sensor, then the indicator 60b may be a magnet that is seated within a recess defined in the exterior surface of the bearing 56a or the drum drive shaft 38. Alternatively, the magnet may be provided on mounting assembly 56 and the magnetic sensor may be provided on the drum drive shaft 38.

In yet other embodiments, such as in FIG. 4A, instead of the indicator 60b being provided on the drum drive shaft 38, an indicator 160b may be provided on the drive belt 142 and a suitable sensor 160 may be utilized to "read" or sense that indicator 160b. Similarly, instead of the sensor and indicator being provided outside drum housing 22, one of the sensor and indicator may be provided on the drum 34 itself and the other of the sensor and indicator may be provided on the drum housing 22. The sensor and indicator components outside of the drum and drum housing may be considered as a proxy for determining the speed of rotation of the drum 34.

As indicated above, sensor 60a or 160 is operatively engaged with controller 36 that, in turn, is operatively engaged with and configured to control the operation of engine 28. In particular, sensor 60a, 160 is capable of affecting the output from engine 28 via controller 36.

The monitoring system operates in the following manner. When engine 28 is rotating drive shaft 30 at a speed sufficiently fast enough to cause activation of centrifugal clutch 40, clutch 40 drives drive belt 42 which in turn rotates drive wheel 44, drum drive shaft 38 and thereby drum 34. The rotating drum 34 brings the cutting blades 34a thereon into contact with wood materials fed into the infeed chute 20 of the wood chipper 10. The rotation speed of drum 34 is monitored by monitoring system 60. If a larger than usual piece of wood is encountered by the drum 34 as it rotates, that larger piece of wood may tend to cause the rotational speed of drum 34 to slow down. In other instances, too much brush, too many tree limbs, or too much cutting debris might tend to clog the space between the automatic feed system and the rotating drum 34. The speed of drum 34 might therefore slow down substantially. The slowdown might be sufficient to effectively cause drum 34 to become stuck and cease rotating.

Because the monitoring system 60 of sensor 60a and indicator 60b is monitoring the rotational speed of drum 34 (by monitoring the rotation of drum drive shaft 38, for example), the slowdown in rotational speed or the complete stoppage of rotation will be detected and relayed to the controller 36. Controller 36 is provided with programming for controlling the operation of engine 28. (In other instances, the programming may be provided in sensor 60a itself.) As a result of a signal sent from sensor 60a to controller 36, the output from engine 28 is automatically reduced below the pre-determined or pre-set threshold value. The drop in engine output will, in turn, reduce the rotation of drive shaft 30 below a threshold speed. In response, the centrifugal force on clutch shoes 48 will reduce to the point that the springs 50 will draw the shoes 46 back toward each other. The friction pads 48b of clutch shoes 48 break contact with the inner surface 40a' of clutch housing 40a and clutch housing 40a therefore stops rotating in the direction of arrow "C". As a consequence, the rotational motion of drive belt 42 in the direction of arrow "D" ceases. Because drive belt 42 is no longer rotating, the drum drive shaft 38 will also no longer rotate and, consequently, drum 34 will no longer rotate. It is then safe for the operator to reach in and manually clear any clogged material from drum housing 22 so that drum 34 will once again be free to rotate.

However, just because the clogged material has been removed from drum housing 22 doesn't means that drum 34 will automatically start rotating again. Instead, the operator has to physically manipulate controller 36 in order to throttle the engine 28 up in order to increase the output therefrom. An increase in output from engine 28 causes drive shaft 30 to pick up speed, causing the centrifugal clutch 40 to rotate faster. When the rotational speed of centrifugal clutch 40 passes the pre-set threshold value, clutch shoes 48 will once again move outwardly in the direction of arrow "B" and come into frictional engagement with inner surface 40a' of clutch housing 40a. Clutch housing 40a will begin to rotate and will therefore cause drive belt 42 to rotate. Drive belt 42, in turn, causes drive wheel 44 to rotate, and this, in turn, rotates the drum drive shaft 38 keyed to drive wheel 44. Rotation of the drum drive shaft 38 causes rotation of drum 34 and drum 34 therefore resumes the reduction of the wood material being fed into the infeed chute 20.

Figure 7:
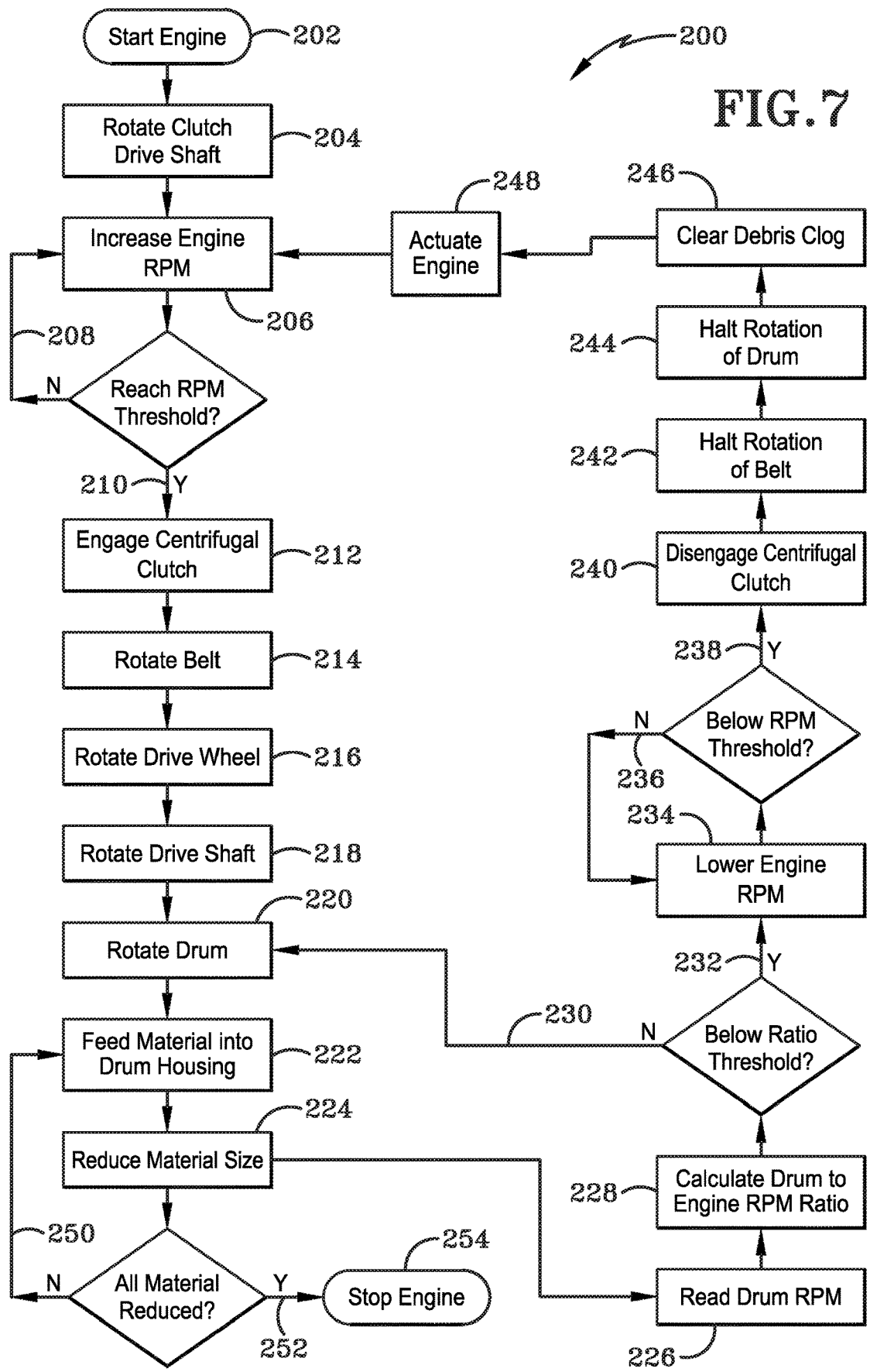
FIG. 7 is a flowchart illustrating a method of utilizing the wood chipper to reduce the size of material fed into the same.

The operation of wood chipper 10 is illustrated in the flow chart of FIG. 7 with the operation generally being indicated by the reference number 200. In a first step 202, the engine 28 is started. (This may be accomplished by the operator engaging controller 36.) In a second step 204, engine 28 will rotate drive shaft 30 about the axis "Y". In a third step 206, the operator will increase the engine's output or revolutions per minute (rpm). This in turn will increase the rotational speed of drive shaft 30. Centrifugal clutch 40 will only engage when a threshold speed of rotation of engine 28 and thereby of drive shaft 30 is reached. If the threshold speed is not yet reached, as indicated at 208, the speed of the engine speed will be increased further as at 206. When the threshold speed is reached, as at 210, the threshold clutch 40 will engage as at 212 and this in turn will cause drive belt 40 (or a drive chain) to rotate as at 214. Rotation of drive belt 40 will cause rotation of drive wheel 42 and thereby of drum drive shaft 38 as indicated at 216 and 218, respectively. Rotation of drum drive shaft 38 will cause drum 34 to rotate as at 220. Material is then fed into the intake chute 20 and then fed by the feed assembly into drum housing 22 as at 222. The rotating drum 34 will reduce the size of the materials fed into drum housing 22 by contacting the same with the cutting blades 34a. The reduction of the materials is indicated in the flowchart at 224.

While drum drive shaft 38 and drum 34 are rotating, sensor 60a will sense or read the drum rpm as indicated at 226 and a specially programmed processor in controller 36 or in sensor 60a (or elsewhere on wood chipper 10) will calculate the drum-to-engine rpm ratio as at 228. The drum-to-engine rpm ratio will be compared to a pre-set threshold value stored in the processor. While the drum-to-engine rpm ratio remains above the pre-set threshold value, as at 230, drum 34 will continue to rotate 220, material will continue to be fed into drum housing as at 222, and materials will continue to be reduced in size as at 224.

If, however, the drum-to-engine rpm ratio drops below the ratio threshold as at 232, the programming in the processor in controller 36, for example, will lower the engine rpm, as at 234. If the engine rpm drops below a threshold rpm, as at 238, the centrifugal clutch 40 will disengage, as at 240. (If the engine rpm is above the pre-set rpm threshold as at 236, then the processor will continue to lower the engine rpm as at 234 until the engine threshold rpm is reached and the centrifugal clutch 40 disengages as at 238.) When the centrifugal clutch 40 disengages, as at 238, the rotation of drive belt 42 is halted, as at 242. When drive belt 42 stops rotating, drive wheel 44, drum drive shaft 38, and thereby drum 34 stop rotating. This is indicated at 244 in the flowchart. The operator is then able to manually clear any clogged material from the feed assembly or drum housing 22. This clearing of the clogged material is indicated at 246. The operator then actuates the engine 28 as at 248 in the flowchart. The engine rpm is increased as at 206 and the process of reducing material resumes as before.

If all the material has not been reduced, as at 250, the operator will continue to feed material into the drum housing as at 222 and reduce material size as at 224. When all material has been reduced by the rotating drum 34, as indicated at 252, the operator will utilize the controller 36 to stop the engine 28. This is indicated in the flowchart at 254.

Figure 8A:
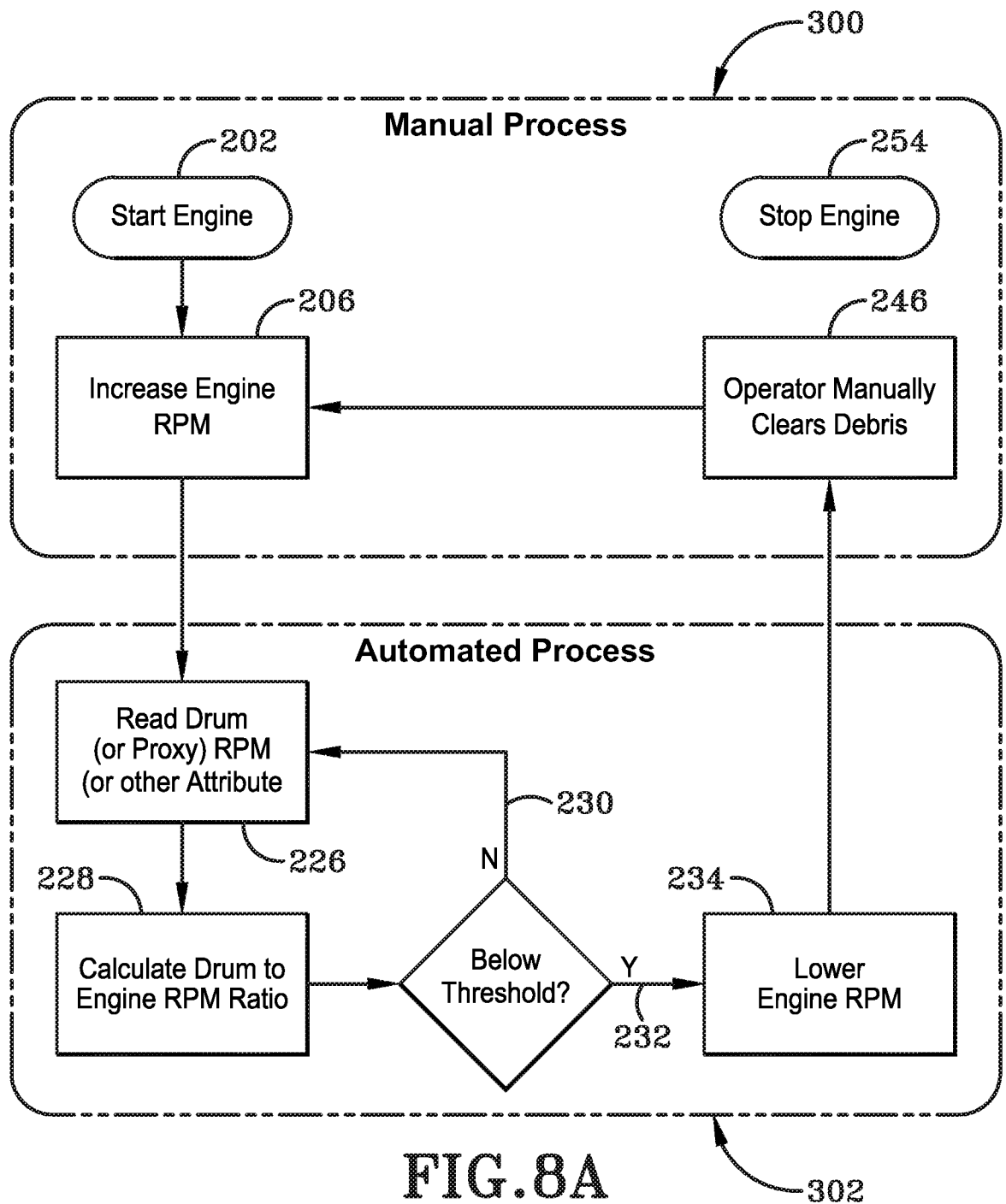
FIG. 8A is a flowchart illustrating a first method of automatically halting rotation of the cutting drum utilizing the monitoring system and drive assembly of the present disclosure.

FIG. 8A shows an abbreviated method of using the wood chipper 10. The flowchart of FIG. 8A illustrates a portion of the method 200 shown in FIG. 5C but indicates some of the steps as being manual steps 300 performed by the operator and indicates other steps 302 as being performed automatically by the wood chipper 10, particularly by the monitoring system 60 of the sensor 60a, indicator 60b, and controller 36.

Figure 8B:
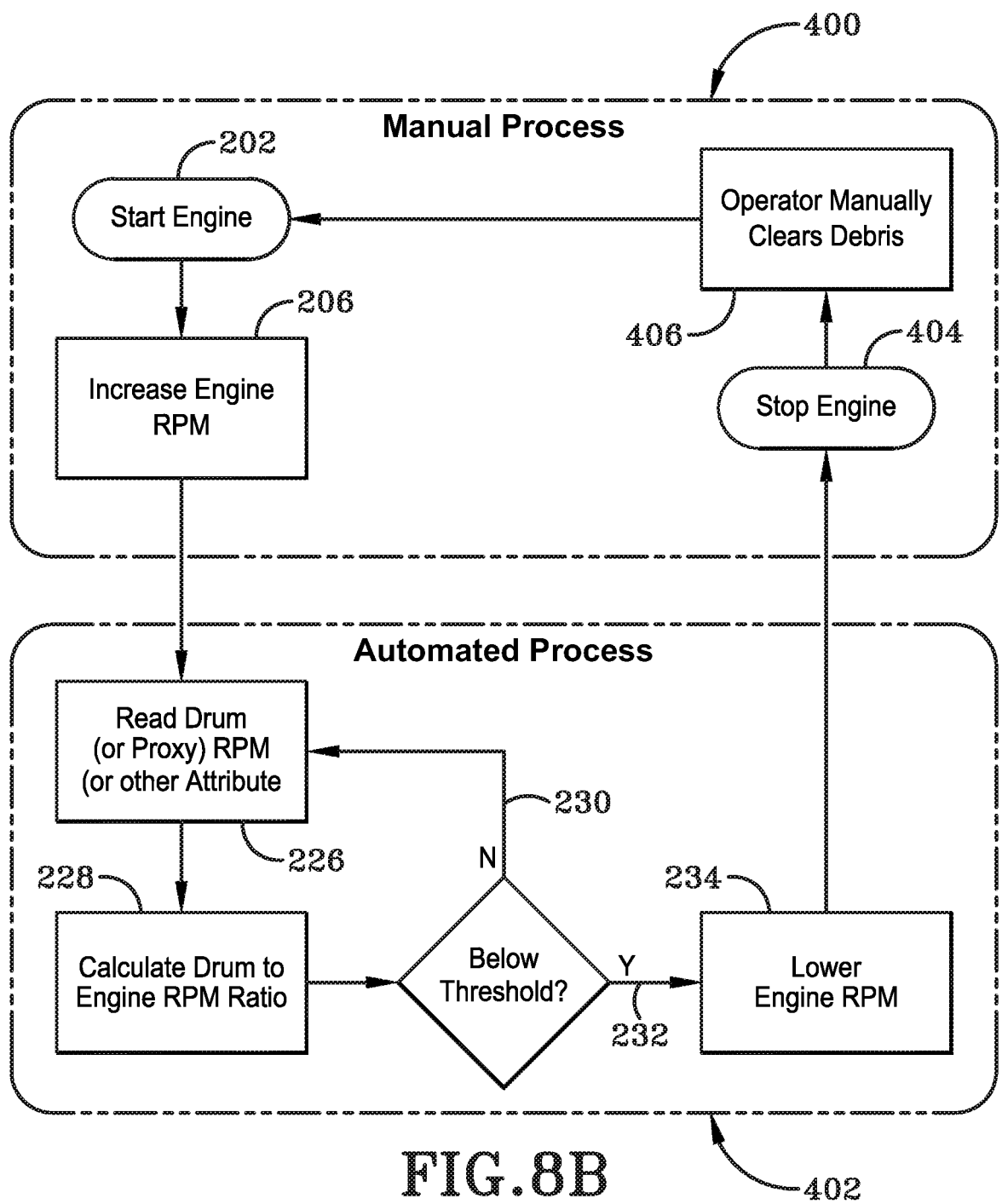
FIG. 8B is a flowchart illustrating a second method of automatically halting the rotation of the cutting drum utilizing the monitoring system and drive assembly of the present disclosure.

FIG. 8B shows an alternative abbreviated method of using the wood chipper 10. This flowchart is a modified method that includes steps of the process 200 shown in FIG. 5C. In the flowchart of FIG. 8B, the manual steps 400 are performed by the operator and the steps 402 are performed automatically by the wood chipper 10, particularly by the monitoring system of sensor 60a, indicator 60b, and controller 36. In this modified method, instead of the engine rpm being lowered to below the threshold level for the centrifugal clutch 40 to disengage, the engine rpm is lowered to the point that the engine stops as at 404. When the engine is completely shut down, the operator is then able to manually clear away debris from the drum housing 22, as at 406. The operator will then restart the engine 28 as indicated at 202, and the process of reducing the materials will continue.

It will be understood that the wood chipper in accordance with the present disclosure may have any number of other sensors in addition to the drum speed sensor described herein. These other sensors may perform tasks other than detecting drum speed and may operate completely independently of the drum speed sensor.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

All definitions, as defined and used herein, should be understood to control over dictionary definitions, definitions in documents incorporated by reference, and/or ordinary meanings of the defined terms.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 5C0 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0. % of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, any method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clarity, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. A wood chipper comprising:
    a drum having a plurality of cutting blades;
    a drive assembly for rotating the drum, wherein the plurality of cutting blades is adapted to reduce a size of wood materials contacted by the drum as the drum rotates;
    a monitoring system for monitoring a speed of rotation of the drum; and
    a release mechanism operatively engaged with the drive assembly and the monitoring system, wherein the release mechanism stops driving rotation of the drum when a monitored speed of rotation of the drum drops below a pre-set threshold.

2. The wood chipper according to claim 1, wherein the drive assembly includes a drive belt, and wherein the monitoring system includes a sensor configured to sense one of the speed of rotation of the drum and a speed of rotation of the drive belt.

3. The wood chipper according to claim 2, wherein the drum is mounted within a drum housing, wherein the monitoring system further includes an indicator that is detected by the sensor, and wherein one of the sensor and the indicator is provided on the drum housing; and the other of the sensor and the indicator is provided on the drum or the drive belt.

4. The wood chipper according to claim 3, wherein the sensor is an optical sensor and the indicator is one of a marking, a reflective surface, and a non-reflective surface.

5. The wood chipper according to claim 3, wherein the sensor is a magnetic sensor and the indicator is a magnet.

6. The wood chipper according to claim 3, wherein the drive assembly includes an engine that drives a drive shaft which is operatively engaged with the drum; and the monitoring system further includes a processor provided with programming for calculating a ratio of the speed of rotation of the drum relative to a speed of rotation of the drive shaft.

7. The wood chipper according to claim 1, wherein the release mechanism is a centrifugal clutch that is movable between an engaged position and a disengaged position; and when the centrifugal clutch is engaged the drum rotates, and when the centrifugal clutch is disengaged, the drum stops rotating.

8. The wood chipper according to claim 1, wherein the monitoring system includes a controller operably connected to a sensor, the controller being configured to control an operation of the rotatable drum based on input from the sensor and detection of a drop in a speed of rotation of the rotatable drum.

9. The wood chipper according to claim 8, wherein the controller is configured to stop rotation of the rotatable drum if the speed of rotation of the rotatable drum drops below the threshold.

10. The wood chipper according to claim 9, wherein the drive assembly includes an engine operably engaged with the rotatable drum via a centrifugal clutch, wherein said engine is operatively controlled by the controller, and when the speed of rotation of the rotatable drum drops below the threshold, the controller disengages the centrifugal clutch by reducing power generated by the engine.

11. A wood chipper comprising:
an infeed system;
a rotatable cutting system spaced from the infeed system;
a drive system for driving the rotatable cutting system;
a detector disposed in communication with the rotatable cutting system and the drive system, the detector arranged to detect a speed of rotation of the rotatable cutting system; and wherein the detector allows rotation of the rotatable cutting system when a pre-set threshold speed of rotation is met or exceeded by the rotatable cutting system; and wherein the detector causes the drive system to cut power to the rotatable cutting system when the speed of rotation of the rotatable cutting system drops below the pre-set threshold speed of rotation;
wherein the drive system includes a centrifugal clutch that is engaged when the pre-set threshold speed of rotation is met or exceeded and is disengaged when the rotation speed drops below the pre-set threshold speed of rotation.

12. A method of controlling a material reduction device comprising:
feeding material to be reduced in size toward a reducing mechanism;
rotating the reducing mechanism;
reducing the material with the rotating reducing mechanism;
detecting a speed of rotation of the rotating reducing mechanism;
controlling a drive assembly that drives the rotation of the rotating reducing mechanism based on the detected speed of rotation, wherein the drive assembly includes a centrifugal clutch; and
causing the reducing mechanism to cease rotating when the speed of rotation drops below a threshold value while the rotating reducing mechanism is reducing material by disengaging the centrifugal clutch.

13. The method according to claim 12, wherein the detecting of the speed of rotation includes:
providing a sensor configured to sense the speed of rotation of the reducing mechanism;
gathering speed of rotation data with the sensor;
comparing the gathered data with a speed of an engine powering the drive assembly;
calculating a ratio of the speed of rotation of the reducing mechanism with the speed of the engine; and
reducing the speed of the engine if the ratio is lower than the threshold value.

14. The method according to claim 13, further comprising:
disengaging the centrifugal clutch when the speed of the engine is reduced.

15. The method according to claim 14, wherein the disengaging of the centrifugal clutch causes the reducing mechanism to cease rotating.

16. The method according to claim 12, further comprising:
slowing the speed of rotation of the reducing mechanism by accumulating material debris around the reducing mechanism.

17. The method according to claim 16, further comprising:
removing the accumulated material debris when rotation of the reducing mechanism has ceased.

18. The method according to claim 17, further comprising:
reengaging the drive assembly when the accumulated material debris has been removed.

19. The method according to claim 16, further comprising:
engaging the centrifugal clutch of the drive assembly when the drive assembly speed reaches the threshold value; and
restarting rotation of the reducing mechanism when the centrifugal clutch is reengaged.

20. A wood chipper comprising:
a rotatable drum configured to reduce a size of wood fed into the wood chipper;
a sensor configured to sense a speed of rotation of the rotatable drum; and
a controller operably connected to the sensor, the controller being configured to cut power to the rotatable drum when the speed of rotation of the rotatable drum drops below a pre-set threshold value;
wherein the drum is mounted within a drum housing, wherein the wood chipper further includes an indicator that is detected by the sensor, wherein one of the sensor and the indicator is provided on the drum housing, and the other of the sensor and the indicator is provided on the drum or a drive belt that drives the drum.

* * * * *